(No Model.)
G. A. LOWRY.
NIPPERS FOR TWINE MAKING MACHINES.
No. 474,580. Patented May 10, 1892.
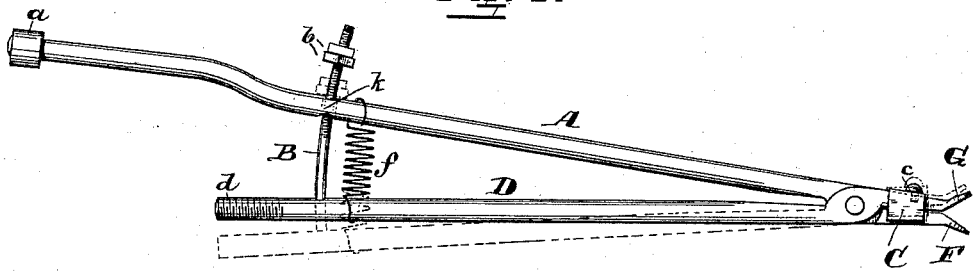
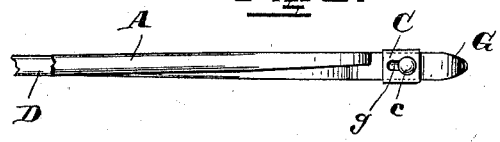

United States Patent Office.

GEORGE A. LOWRY, OF DES MOINES, IOWA.

NIPPERS FOR TWINE-MAKING MACHINES.

SPECIFICATION forming part of Letters Patent No. 474,580, dated May 10, 1892.

Application filed July 14, 1890. Renewed April 14, 1892. Serial No. 429,117. (No model.)

*To all whom it may concern:*

Be it known that I, GEORGE A. LOWRY, a citizen of the United States, residing at Des Moines, in the county of Polk and State of Iowa, have invented a new and useful Improvement in Nippers for Twine-Making Machines, &c., of which the following is a specification.

My invention relates to an improvement in nippers which may be used for various purposes, but is particularly designed for use in connection with an automatic feeder for machines for making twine of the general class described and shown in the applications for patents filed June 9, 1890, Serial No. 354,816, and July 29, 1890, Serial No. 360,293.

The object of my invention is to construct nippers which will have a wide "bite," and thus be enabled to grasp a sufficient quantity of material, and yet be of about the usual size for such an implement.

My invention consists in the construction and combination of parts hereinafter described and claimed.

Like letters refer to the same parts in both figures of the drawings, in which—

Figure 1 is a side view of my invention, and Fig. 2 is a plan view of a portion thereof on a somewhat reduced scale.

In the form which I prefer, and which is shown in the accompanying drawings, two rods A D are crossed and pivoted together near one pair of their ends, and these latter are flattened into a pair of jaws G F, which are flared outwardly a portion of their length, so as to produce a wide mouth. To regulate the width to which these flaring jaws may be spread apart, I may secure to one of the rods, as D, a bolt B and cause the same to pass through an aperture $k$ in the opposite rod A and provide the outer end of such bolt with suitable nuts $b$, which can be adjusted thereon, so as to limit the movement of one rod with respect to the other. A collar C, with a horizontal and two vertical portions, is secured to the upper side of the flattened portion of one rod and extended so as to embrace the sides of both rods. This collar has an elongated slot G, and by means of a set-screw C, passing through this slot, is made adjustable to and from the flaring jaws. The collar therefore may be used to regulate the depth of the recess between the jaws when they are opened.

While my nippers, as before stated, are adapted to various uses and I do not mean to confine myself to any particular one, I have found it particularly advantageous when a series of them is applied to an endless belt, which carries them successively to a trough filled with grass or straw, and thence to the feeding-trough of a machine for making twine, such as is set forth and shown in prior applications filed by me as aforesaid. When the nippers are designed to be employed in such a machine, one rod, as D, is preferably provided with a screw-threaded end $d$, by means of which it may be attached to the belt, and the other rod, as A, is provided with a loose roller $a$, against which the cam which throws the jaws open may strike. A spring $f$ may be utilized to automatically close such rods. In such a machine the flaring of the jaws insures the entrance of a sufficient quantity of the material into the grasp of such jaws, and the adjustment of the collar determines the depth of the mouth or recess. In practice I have found the divergence or flare of the jaws to be a most important feature.

The form and arrangement of the several features may be varied without departing from the principle embodied in my invention, and modifications too numerous to be set forth within the confines of a proper specification will readily suggest themselves to the skilled mechanic.

What I claim, and desire to secure by Letters Patent, is—

1. Nippers having flaring jaws, a collar arranged thereon, and means for adjusting such collar, whereby the depth of the bite of the jaws is regulated.

2. Nippers having flaring or divergent jaws, and devices for regulating the spread of the same, and means for regulating the depth of the bite of such jaws, substantially as and for the purpose set forth.

3. Nippers composed of a pair of pivoted rods having jaws, a collar, means for adjusting the collar upon the jaws, and a bolt having a nut, substantially as and for the purpose set forth.

4. In an automatic feeder for a twine-making machine, nippers having flaring jaws, a collar, means for adjusting the collar upon the jaws, a bolt having a nut, and a retracting-spring, substantially as and for the purpose set forth.

GEORGE A. LOWRY.

Witnesses:
B. F. GREE,
H. G. GREE.